US008554731B2

(12) United States Patent
Aguera y Arcas et al.

(10) Patent No.: US 8,554,731 B2
(45) Date of Patent: Oct. 8, 2013

(54) CREATING AND PROPAGATING ANNOTATED INFORMATION

(75) Inventors: Blaise H. Aguera y Arcas, Seattle, WA (US); Scott V. Fynn, Seattle, WA (US); Matthew Bret MacLaurin, Woodinville, WA (US); Eric Paul Bennett, Bellevue, WA (US); Christian James Colando, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 129 days.

(21) Appl. No.: 12/752,074

(22) Filed: Mar. 31, 2010

(65) Prior Publication Data

US 2011/0246502 A1 Oct. 6, 2011

(51) Int. Cl.
*G06F 17/30* (2006.01)

(52) U.S. Cl.
USPC .......................................................... 707/627

(58) Field of Classification Search
USPC .......................................................... 707/627
See application file for complete search history.

(56) References Cited

U.S. PATENT DOCUMENTS

| | | | |
|---|---|---|---|
| 7,424,541 B2 | 9/2008 | Bourne | |
| 2006/0041632 A1 | 2/2006 | Shah et al. | |
| 2008/0127176 A1 | 5/2008 | Lee et al. | |
| 2008/0208973 A1 | 8/2008 | Hayashi et al. | |
| 2008/0215623 A1 | 9/2008 | Ramer et al. | |
| 2009/0006338 A1 | 1/2009 | Ives et al. | |
| 2009/0307205 A1 | 12/2009 | Churchill et al. | |
| 2009/0324022 A1* | 12/2009 | Sangberg et al. | 382/118 |
| 2009/0327282 A1 | 12/2009 | Wittig et al. | |
| 2010/0029326 A1* | 2/2010 | Bergstrom et al. | 455/556.1 |
| 2010/0142715 A1* | 6/2010 | Goldstein et al. | 381/56 |
| 2010/0198757 A1* | 8/2010 | Cheng et al. | 706/12 |
| 2010/0277611 A1* | 11/2010 | Holt et al. | 348/231.2 |
| 2010/0312596 A1* | 12/2010 | Saffari et al. | 705/7 |

FOREIGN PATENT DOCUMENTS

| | | |
|---|---|---|
| WO | 2007080473 A1 | 7/2007 |
| WO | 2007126699 A1 | 11/2007 |
| WO | 2010006062 A1 | 1/2010 |

OTHER PUBLICATIONS

Smith, Marc, "Book in progress: 'Analyzing Social Media Networks with NodeXL: Insights from a Connected World'", Retrieved at <<http://www.connectedaction.net/ >>, 2008, 19 pages.
"What to Expect for Search Engine Marketing in 2009", Retrieved at <<http://www.apogee-search.com/Resources/featured_articles/SearchMarketing2009.php >>, dated Jan. 13, 2009, retrieved on Feb. 3, 2010, 3 pages.

(Continued)

*Primary Examiner* — Jorge A Casanova (57) ABSTRACT

Content may be collected, annotated, and propagated in a unified process. In one example, a mobile device such as a smart phone is used to collect information. The information may be text, video, audio, etc. The information may be sent to a reaction service, which may return an annotation of the information. The annotation may be attached to the information to create an annotated document. The annotated document may be communicated to other users. Additionally, the annotated document may be stored in a way that associated the annotated document with the user who created or captured the information. The ability to capture information, obtain annotations to the information, and propagate the annotated information may facilitate the creation of social media, such as social network postings or online photo albums.

17 Claims, 7 Drawing Sheets

(56) References Cited

OTHER PUBLICATIONS

Wasser, Michael M., "SocialBrowsing: Augmenting Web Browsing to Include Social Context", Retrieved at <<http://www.cs.umd.edu/Honors/reports/Wasser-SocialBrowsing.pdf >>, dated 2008, retrieved on Feb. 2, 2010, 6 pages.

"Sempo's Point of View (POV) on Social Media", Retrieved at <<http://www.sempo.org/learning_center/editorials/sempo_social_media.pdf>>, dated May 27, 2009, retrieved on Feb. 2, 2010, 6 pages.

International Search Report and Written Opinion Received of the International Searching Authority for PCT Application No. PCT/US2011/030548, mailed on Nov. 23, 2011, 10 pages.

\* cited by examiner

CREATING AND PROPAGATING ANNOTATED INFORMATION

BACKGROUND

Computers, smart phones, and other types of devices are used to perform various types of actions. Some of these actions include initiating searches, collecting and organizing information, and sending and receiving messages. Additionally, many devices are multi-function devices—e.g., a smart phone may function as a voice and data communication device, and as a camera. The increasing number of functions that can be implemented on one device, and the increasing availability of connectivity to these devices, allows people to perform many different functions using one device. For example, in the past, posting a photo to a social network involved taking the photo with a camera and then uploading it to the social network using a computer. Now, a person may take a picture on a smart phone, and then may post the picture to his social networking account from the phone.

While people often perform a sequence of actions that are related to each other (e.g., doing a search on a smart phone, and then e-mailing others the results of the search), the platforms on which people perform these related actions often treat the actions as being disjoint. A person can take a photo, perform an image search related to the photo, and post to a social network about a photo, all from a smart phone. However, the person who performs these actions typically views the different actions as separate events, often involving separate pieces of software. Part of the reason for which these actions are viewed as separate is that the local and remote software infrastructure does not support linking these actions together. Different actions can be part of a single data flow. For example, searching for a restaurant and then writing a social network post about the restaurant are part of a single sequence of actions concerning a single concept (i.e., the restaurant). But the software that is used to perform these different actions often fails to support the linkage between these actions.

SUMMARY

The creation, annotation, and propagation of information may be performed as part of a unified process. Such a process may facilitate the flow of information as social media.

Carrying a process to create, annotate, and propagate data may begin with the creation of a document. A document may constitute any type of information, such as text, images, sound, etc. For example, a two- or three-word query may be a small text document. Or, a digital photograph may be an image document. Once such a document is created, it may be sent to a reaction service, which reacts to the document in some manner. For example, the reaction service may attempt to provide information relating to the document. A search engine that reacts to a query may be one facet of a reaction service. However, a reaction service may take other types of actions. For example, a reaction service may react to a photograph by attempting to identify a person or object in the photograph. Or, a reaction service may react to a sound recording by attempting to determine whether the recording is of a known song. Once the reaction service reacts to the document, it provides information in response.

The information that is provided in response to the document may be viewed as annotations to the document. For example, if one enters a text query such as "Moroccan food", any search results (e.g., the names, addresses, and Uniform Resource Locators ("URLs") of one or more Moroccan restaurants) may be viewed as annotations to the query. Or, if the document is an image of a statue, then the reaction service might identify the statue shown in the image, so the name of the statue may be an annotation. The document and its annotations may form part of an annotated document.

A user may use the annotated document in various ways. For example, the user may decide to attach some of the annotations to the document as metadata. Thus, if a user takes a photo of a famous statue, the reaction service may provide the name of the statue. That name may then become part of the metadata for the photo. Additionally, the user may decide to propagate the document and/or some or all of its annotations in some manner. For example, once the photo mentioned above has been annotated with the name of the statue in the photo, that photo and its annotation can be sent to an online photo album. Or, the user could make the photo and its annotation part of a status post in a social network. Software on a user's device may facilitate the process of obtaining a reaction to a document, determining what annotations to associate with the document, and propagating the document to other places.

In one example, the process of creating a document and obtaining a reaction to that document takes place on a mobile device, such as a smart phone or handheld computer. Software installed on the mobile device may help the user to obtain a reaction to data that has been created on the device. For example, the provider of a reaction service might provide an application that can be installed on a phone. If the user takes a photo, the application may provide an on-screen button that the user can click to send the photo to the reaction service, and to obtain annotations to the photo from the reaction service. The application could provide similar capabilities for text, sound, or any other type of information. Moreover, the application may facilitate the process of propagating or communicating the document and its annotations. For example, the application could create drafts of social network posts or e-mails for the user's approval. Or, the application could send annotated photos to online photo albums. In this sense, the application may facilitate the creation of social media using both information that is captured on the user's device (the document), and information that is provided by a remote service (the annotations).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Computers and other devices are often used to perform actions such as initiating searches, collecting and organizing information, and sending and receiving messages. People type queries into search engines to request information. They take pictures with smart phone, or upload pictures to their computers from standalone cameras. They capture and transmit audio information with microphones. They send e-mail, post information to blogs or social networks, and post photos to photo-sharing sites. Normally, these actions are viewed as being conceptually separate. Many people consider performing a search as being an entirely separate action from posting to a social network, or taking a picture, or recording a sound. In some cases, these views are reflected in, or reinforced by, the use of different devices to perform the actions. For example, a person might use his or her desktop computer to organize albums of photos uploaded from a standalone camera. That same person might use a browser on a smart phone visit a search engine in order to find out information about an object that appears in one of the photos.

However, trends in computing suggest ways to unify many of the actions that people perform on their devices. One trend is that small devices are more capable than they have been in the past. They continue to become more capable, and connectivity of these devices continues to improve. Wireless phones and music players often have cameras, large amounts of memory and storage, and enough processing power to run significant operating systems and applications. Connectivity between these devices and the rest of the world is faster and cheaper than it has been in the past. Cellular networks now support high speed data transmission, and many devices can switch between cellular communication and faster and cheaper WiFi networks, when WiFi networks are available. Many devices have cameras whose quality rivals that of standalone cameras. For these reasons, wireless phones and other small devices may become the principal type of devices that people use to capture information and to interact with the world.

If small devices are the focal point for users to interact with the world, this fact suggests new paradigms of how to view information, and new systems and techniques that can be built around those paradigms. In one example, it becomes convenient to think of any information that can be captured on the device as kind of document, which can be reacted to by a remote service. Moreover, it becomes convenient to think of the reaction itself as a kind of annotation to the document. These documents and their annotations can be viewed of as a form of social media. These social media can be associated with the users who create them, and can be communicated to others, in the same way as other social media.

For example, a text query to a search engine can be viewed as a small document (possibly a two- or three-word document), the process of generating search results can be viewed as a reaction to that document, and the results themselves can be viewed as annotations to that document. This set of analogies simply applies labels to the actions that are performed in the course of carrying out a search. But these analogies suggest ways to use the information that is contained in a search, as well as information about the circumstances surrounding the search. For example, if a person searches for "Moroccan food" on his mobile phone at six in the evening from downtown Seattle (as determined by the phone's clock and location technology), then it can be inferred that the person wants to eat dinner at a Moroccan restaurant in Seattle. The fact that the search has taken place, and its results, can be packaged as a social network post. For example, in addition to returning a result like "Marrakesh Restaurant", this result can also be packaged in the form of a message like "Tim is eating at Marrakesh Restaurant in Seattle", which can be posted to a social network, placed in an on-line diary of restaurants at which Tim has eaten, or can be used in any other way. In other words, the fact that Tim is searching for a Moroccan restaurant in Seattle is combined with some other information that comes from a remote reaction service (which may be located in "the cloud"), and that combined information may be propagated, in whole or in part, as a piece of social media.

In addition to searches, other types of interactions with a small device can be used in ways similar to that described above. For example, a user could use the camera on a smart phone to take a photo. The photo itself, along with information concerning where and when the photo was taken, could be sent to a reaction service. The user might send the photo as a type of query in which the user asks the reaction service to identify the object in the photo, or software on the device might be configured to ask the reaction service to provide any information it can whenever any data is captured by the device. The reaction service could then react to the image and other information by identifying the object in the photo. (E.g., the service could respond by saying, "This is a picture of the Fremont Troll in Seattle," which the service might determine based on the location at which the photo was taken, and by comparing the captured image with other pictures of the Fremont Troll.) In this sense, the photo is a document, and the identification of the object in the photo is an annotation (or part of an annotation) to the photo. The photo, its annotation(s), and/or information based on the annotations can then be propagated and/or stored. For example, the photo, and the annotation identifying the photo, can be sent to an on-line photo-sharing service for storage in one of the user's photo albums. Or, an e-mail or social networking post concerning the phone (e.g., "Tim is in Seattle and found the Fremont Troll") can be created and send through the appropriate communication channels.

One way to implement the foregoing scenarios is to install a type of client software on a device that allows users to request a reaction to any type of input. For example, an information service provider might operate a type of service that stores a database of indexed information, where the service can use the information in the database to react to various types of input. The service might run server-side programs that receive a piece of input and that canvass the database to determine what is known about the input. A search engine is a limited example of this type of service, in the sense that search engines contain text indices on text data, image data, video data, etc., which can be used to react to text queries. However, a more general reaction service could take an arbitrary piece of data (e.g., text, image, video, audio, etc.), and could evaluate the data in any appropriate manner to determine what is known about the data. The reaction service can then provide its reaction. An information service provider that provides this type of service may provide a client application to be installed on mobile phones and other types of device. When a user collects any information on the device (whether through keyboard input, camera input, microphone input, etc.), the user may invoke the client application on that input. The client application may then send the input, and possibly any related information—such as the time the input was captured, or the location of the device at the time the input was captured—to the reaction service. The client application may then combine the original input and the reaction into an annotated document. The client application may further facilitate the storage and/or communication of the original input and annotations collected from outside the device. For example, the client application could be used to store a photo in a photo album, or to compose and send a social network post, as in the examples described above.

Figure 1:
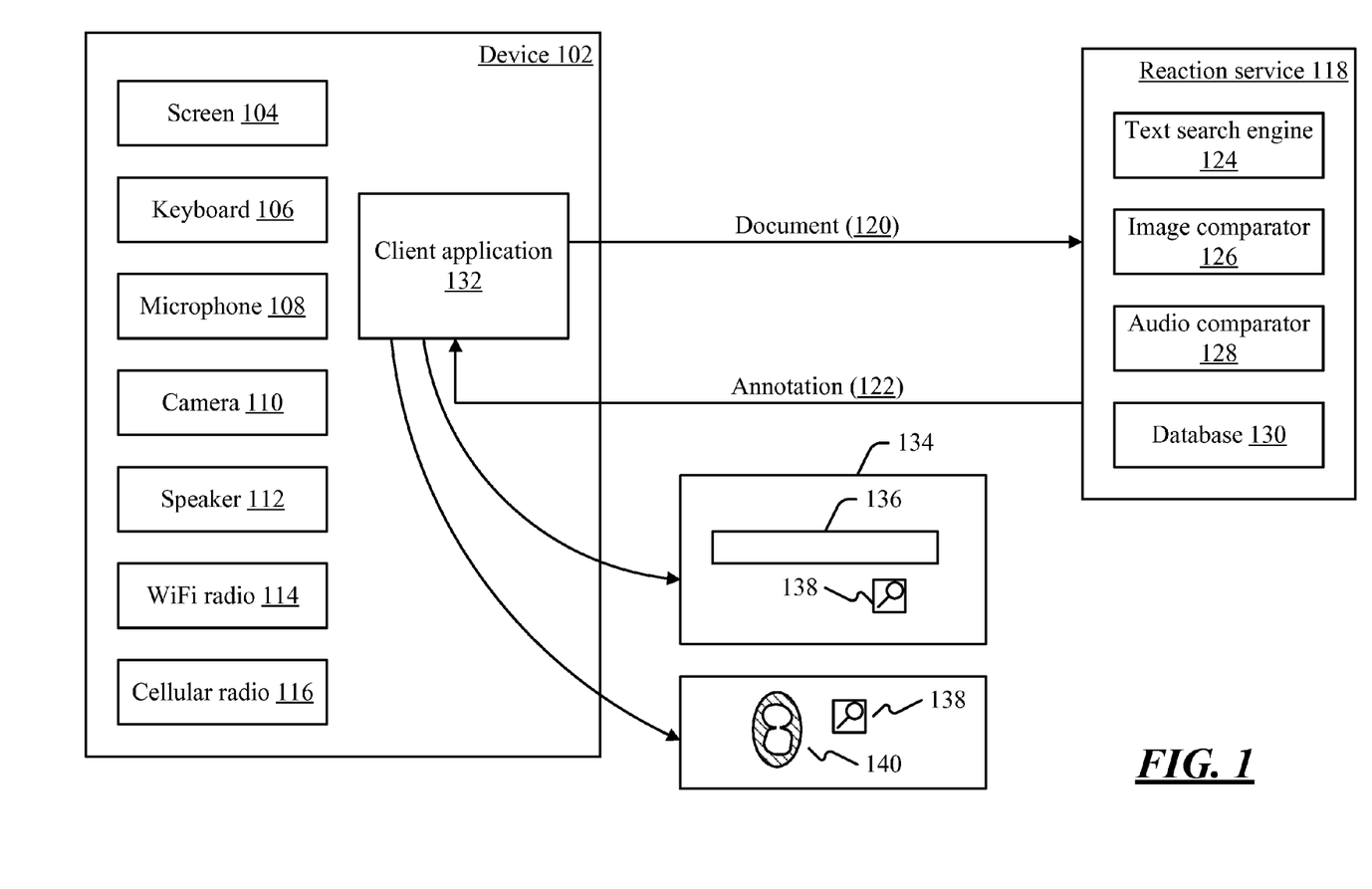
FIG. 1 is a block diagram of an example scenario in which a device may collect information, and in which a reaction service may react to the information.

Turning now to the drawings, FIG. 1 shows an example scenario in which a device may collect information, and in which a reaction service may react to the information. In the scenario shown, device 102 is used to collect information, such as text, images, audio, etc. Device 102 may be a wireless telephone, a music player, a video player, a handheld computer, or may be a device that implements any combination of these functions. In one example, device 102 is a "smart phone" that performs various voice and data communication functions and that also runs various types of software applications. However, device 102 could be any type of device.

Device 102 may contain various types of components. Some of these components are shown in FIG. 1. Screen 104 may display text and images, any may also have tactile sensing capabilities to allow screen 104 to function as an input device. Keyboard 106, or some other type of user input mechanism, may allow a user to input text. Keyboard 106 may be implemented as buttons on device 102, or may be implemented as a "virtual keyboard" on screen 104, if screen 104 provides tactile-sensing capabilities. Microphone 108 captures audio information. Camera 110 captures visual information, and may be used to capture still and/or moving images. Speaker 112 provides audio output. Device 102 may have components that allow it to communicate with the world outside of device 102. For example, device 102 may be equipped with a cellular radio 116 and/or a WiFi radio 114. Cellular radio 116 allows device 102 to communicate with cellular telephone networks. WiFi radio allows device 102 to communicate with a wireless router or wireless access point, which may allow device 102 to communicate through networks such as the internet. Device 102 might have one type of radio but not the other. Or, in another example, device 102 has both kinds or radios (and possibly other types of communication connections, such as a Bluetooth radio, an Ethernet port, etc.), and may switch between different types of communication depending on what communication facilities are available.

Device 102 may communicate with reaction service 118. Reaction service 118, as described above, may receive some type of document 120 (e.g., text, images, audio, etc.), may attempt to determine what is known about that data, and may react to that data by providing some type of annotation 122 to the data. For example, reaction service 118 may provide a text search engine 124 that identifies text documents, images, audio files, etc., that relate in some way to a text query. Reaction service 118 may provide an image comparator 126 that compares an input image to known images, or an audio comparator 128 that compares an input sound to known sounds. Reaction service 118 may contain database 130, which contains indices of various types of information in order to allow text search engine 124, image comparator 126, and audio comparator 128 to react to document 120. Thus, in one example, document 120 contains a text query and the annotations that are sent in reaction to the text query are a set of search results (e.g., text documents, images, audio files, etc., that are in some way related to the text query). In other examples, document 120 represents an image or a sound, and the annotations that are sent in reaction to the document are information about the image or sound, such as an identification of what or who appears to be shown in the image, or the name of a song or other performance that the sound appears to come from. These are some examples of data that could be provided to reaction service 118. However, in general, any type of data could be provided to reaction service 118, and reaction service 118 could react to that data in any manner.

Device 102 may have some computing capability. One type of computing capability is the ability to acquire and run applications. In the example of FIG. 1, device 102 is shown as running client application 132. Client application 132 is an application that helps the user of device 102 to use reaction service 118. Document 120 may be captured on device 102, where document 120 could take any form (e.g., text, images, audio, etc.). Upon receiving a user instruction, client application 132 may send document 120 to reaction service 118. For example, client application 132 might provide a user interface 134, which contains a search box 136 and a search button 138 (which, in this example, is indicated by a magnifying glass symbol). When a user enters text into search box 136 and clicks search button 138, the text in search box 136 becomes document 120, and client application 132 sends this data to reaction service 118. As another example, a user might have used camera 110 on device 102 to capture image 140 (which, in this example, is an image of the "Oval with Points" sculpture). In this case, device 102 may display the captured image on screen 104. Client application 132 may display search button 138 with the image, so that the user's clicking search button 138 causes image 140 to be sent to reaction service 118. In this case, image 140 becomes document 120.

In response to sending document 120 to reaction service 118, client application 132 may receive, from reaction service 118, an annotation 122 to document 120. As described above, annotation 122 might be a set of search results, an identification of an image, an identification of a sound, or any other appropriate type of information. Client application 132 may present annotation 122 to a user, but may also help the user to take some further action in response to the annotation. For example, client application 132 might propose a social network status post that is related to the data and/or its annotation (e.g., "Tim is eating Moroccan food", or "Tim found the Fremont Troll statue"). Or, client application 132 might compose an e-mail, post an image to a photo-sharing site, or provide a link to purchase a commercially-available recording of the song that reaction service 118 has identified. Client application 132 might also allow a user to look at annotations and to provide an indication of which annotations the user wants to associate with document 120 as metadata.

Figure 2:
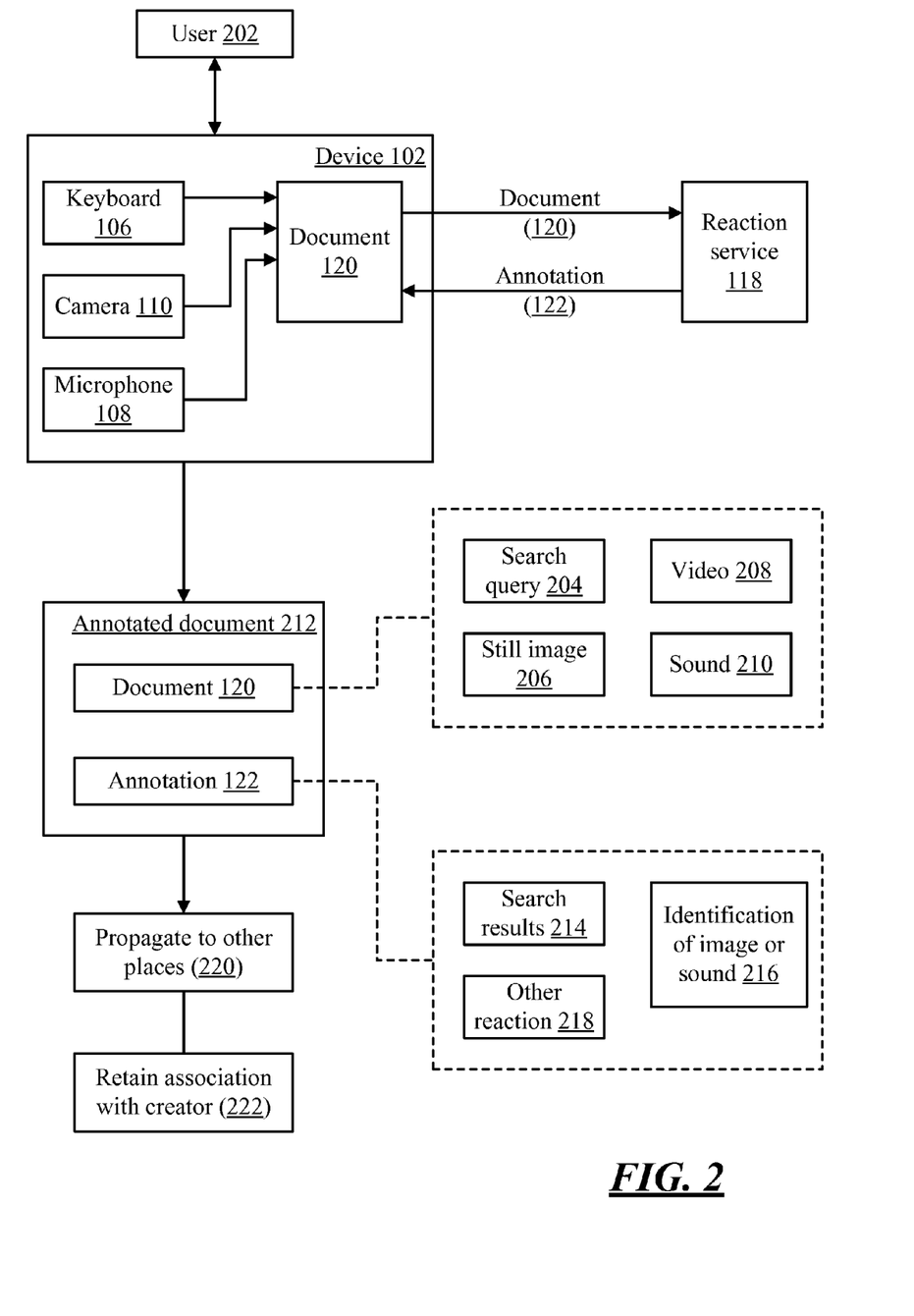
FIG. 2 is a block diagram of some example details of documents, annotations, and how annotated documents may be used.

FIG. 2 shows some example details of documents, annotations, and how annotated documents may be used. User 202 may be a person who carries device 102. As noted above, device 102 may be a wireless telephone, music player, handheld computer, etc. Moreover, device 102 may have input devices such as keyboard 106, camera 110, and microphone 108. Using one or more of these inputs device, user 202 may create document 120, which could be text, an image, a sound, or any combination of these or other components. As discussed above, it is convenient to think of a document as encompassing any type of content that can be reacted to in some manner. Thus, even a small amount of text (e.g., a one- or two-word search query 204) is a document. Still image 206, video 208, or sound recording 210 are other examples of documents.

Device 102 may send document 120 to reaction service 118. Device 102 may use an application (e.g., client application 132, shown in FIG. 1) to send document 120 to reaction service 118, but document 120 could be sent in any manner. For example, user 202 might simply open a browser on device 102 and visit a web site of reaction service 118, thereby sending document 120 (e.g., a search query) to reaction service 118 through that web interface.

Reaction service 118 reacts to document 120 in some manner—e.g., by performing a search, identifying an image or audio clip, etc.—and generates annotation 122 based on that reaction. For example, if the reaction is to perform a search, then annotation 122 may contain one or more search results.

Or, if the reaction is to identify an image, then annotation 122 may be a text string that identifies an object or person in the image.

When annotations are returned to device 102, an annotated document 212 may be produced. Annotated document 212 may be generated by a client application (e.g., client application 132, shown in FIG. 1), but could be produced by any component(s). Annotated document 212 may contain the original document 120 and annotation 122. Annotations may contain, for example, a set of search results (block 214), an identification of an image or sound (block 216), or some other type of reaction (block 218).

Once the annotated document 212 is created, various actions can be performed with respect to that annotated document. In one example, the annotated document (or part of the annotated document, or some of the annotations) may be propagated (block 220) to places other than device 102. Using the above example of a user who is searching for a Moroccan restaurant, once the search results have identified such a restaurant, the user might want to post, to a social network, the fact that he or she is eating at that restaurant. Or, as another example, if a user takes a photo and reaction service 118 annotates the photo by identifying the object shown in the photo, the user might want to post the photo itself, and the identification of what is in the photo, to an album in an online photo-sharing service. These are some examples of how information contained in the annotated document may be propagated to a location outside of device 102. An application (e.g., client application 132, shown in FIG. 1) may assist with this propagation (e.g., by preparing drafts of social network posts for user 202's approval), but the propagation could be performed by any components.

Another action that may happen with regard to annotated document is that the association between the annotated document and the identity of its creator may be retained in some manner (block 222). For example, normally when users create queries, the queries simply disappear after they have been answered. However, when a query is viewed as a document that can be reacted to, the query can be associated with the user 202 who created the query, and this association can persist after the query has been answered. Similarly, if user 202 captures a photo and asks reaction service 118 to react to that photo, the photo can be associated with user 202 (e.g., by storing the photo in an online album that belongs to user 202), and this association can persist after the query is answered.

Figure 3:
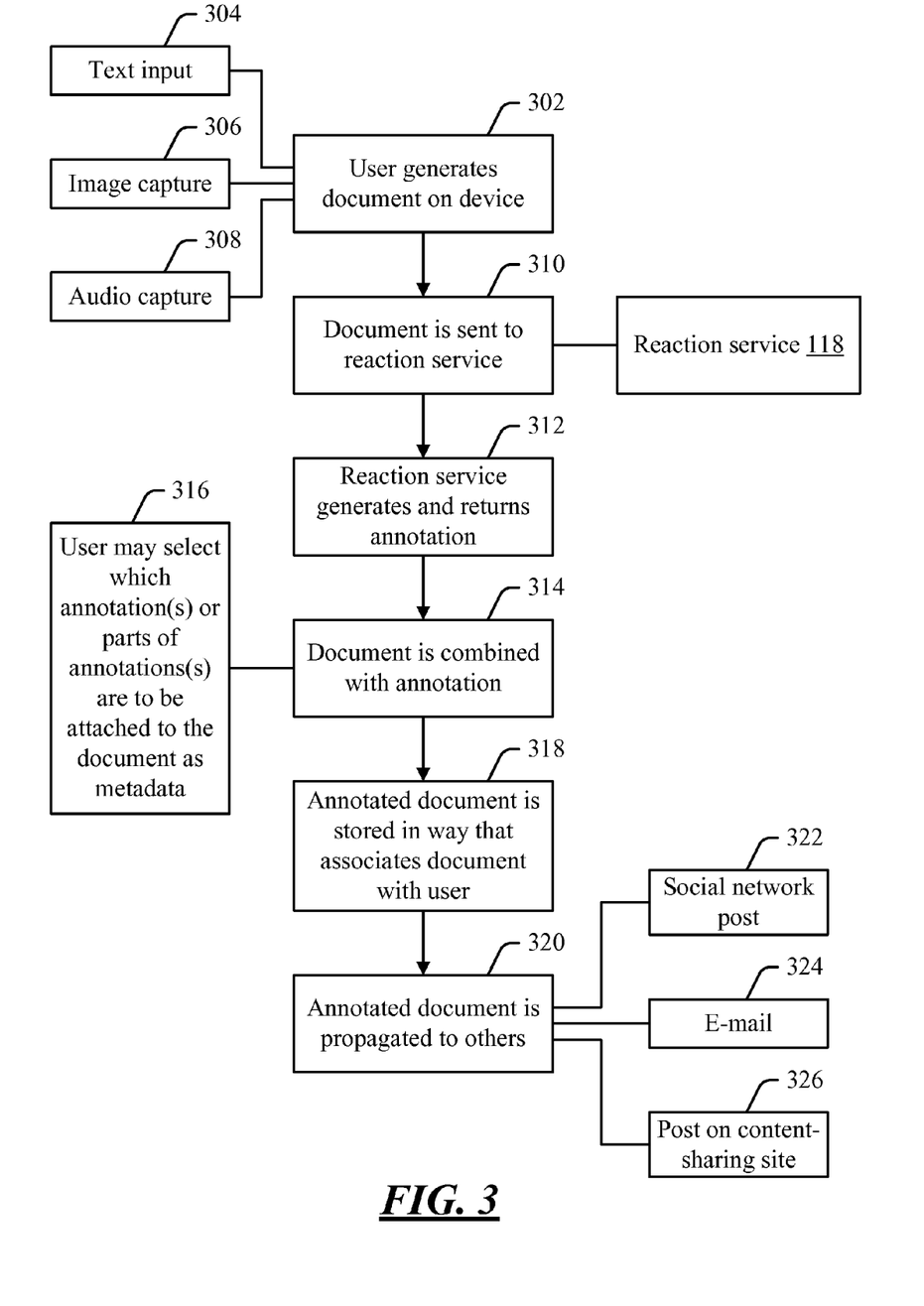
FIG. 3 is a flow diagram of an example process in which documents may be created, annotated, and/or propagated.

FIG. 3 shows, in the form of a flow chart, an example process in which documents may be created, annotated, and propagated. Before turning to a description of FIG. 3, it is noted that the flow diagram of FIG. 3 is described, by way of example, with reference to components shown in FIGS. 1 and 2, although the process of FIG. 3 may be carried out in any system and is not limited to the scenario shown in FIGS. 1 and 2. Additionally, the flow diagram in FIG. 3 shows an example in which stages of a process are carried out in a particular order, as indicated by the lines connecting the blocks, but the various stages shown in this diagram can be performed in any order, or in any combination or sub-combination.

At 302, a user generates a document on a device. The document might be, for example, text that is input with a device's keyboard (block 304), an image captured with a device's camera (block 306), or audio captured with the device's microphone (block 308). After the document is generated on the device, the document may be sent to a reaction service 118 (at 310). As described above, reaction service 118 may use components such as a text search engine, an image comparator, an audio comparator, etc., in order to produce an appropriate reaction to the document. Once reaction service 118 reacts to the document, reaction service 118 generates and returns annotations to the document (at 312). As described above, the annotations may comprise search results, an identification of an image or a sound, or any other information that is generated in response to the document.

At 314, the document may be combined with its annotation to produce an annotated document. For example, a set of search results may be attached to the query that generated those results. Or, if the document that was sent to the reaction service was an image, then an identification of an object shown in the image may be an annotation, and this identification may be associated with the image. In a sense, the annotations are a type of metadata that described the document. In one example, a user may be given the option to decide which of the annotations returned by reaction service 118 are to be attached to the document as metadata (at 316). For example, if the user takes a picture of the Fremont Troll statue in Seattle and reaction service 118 identifies the object in the picture as the Fremont Troll, the user could be asked if he or she wants to label the image as "Fremont Troll." If so, then that label effectively becomes a form of metadata that is attached to the image.

At 318, the annotated document may be stored in a way that associates the document with the user who created the document. For example, if a user takes a picture, the picture may be stored in one of the user's online photo albums in a photo-sharing service, or may be posted to the user's profile on a social network. At 320, the annotated document (or some part of the annotated document) may be propagated to other users, who may be at a location remote from the device at which the annotated document was created. For example, the document and/or its annotations (or some of its annotations, or some information derived from the document or its annotations) may be posted on a social network (block 322), sent to other users via e-mail (block 324), or posted on a content-sharing site such as a photo-sharing site or blogging site (block 326). It is noted that one aspect of content that is viewed as social media is that the content tends to be associated with a user (rather than anonymous like a typical search query), and tends to be communicated to other users (rather than kept solely in the user's private storage). In this sense, the process described in FIG. 3 may facilitate the creation of social media through connected, handheld devices.

Figure 4:
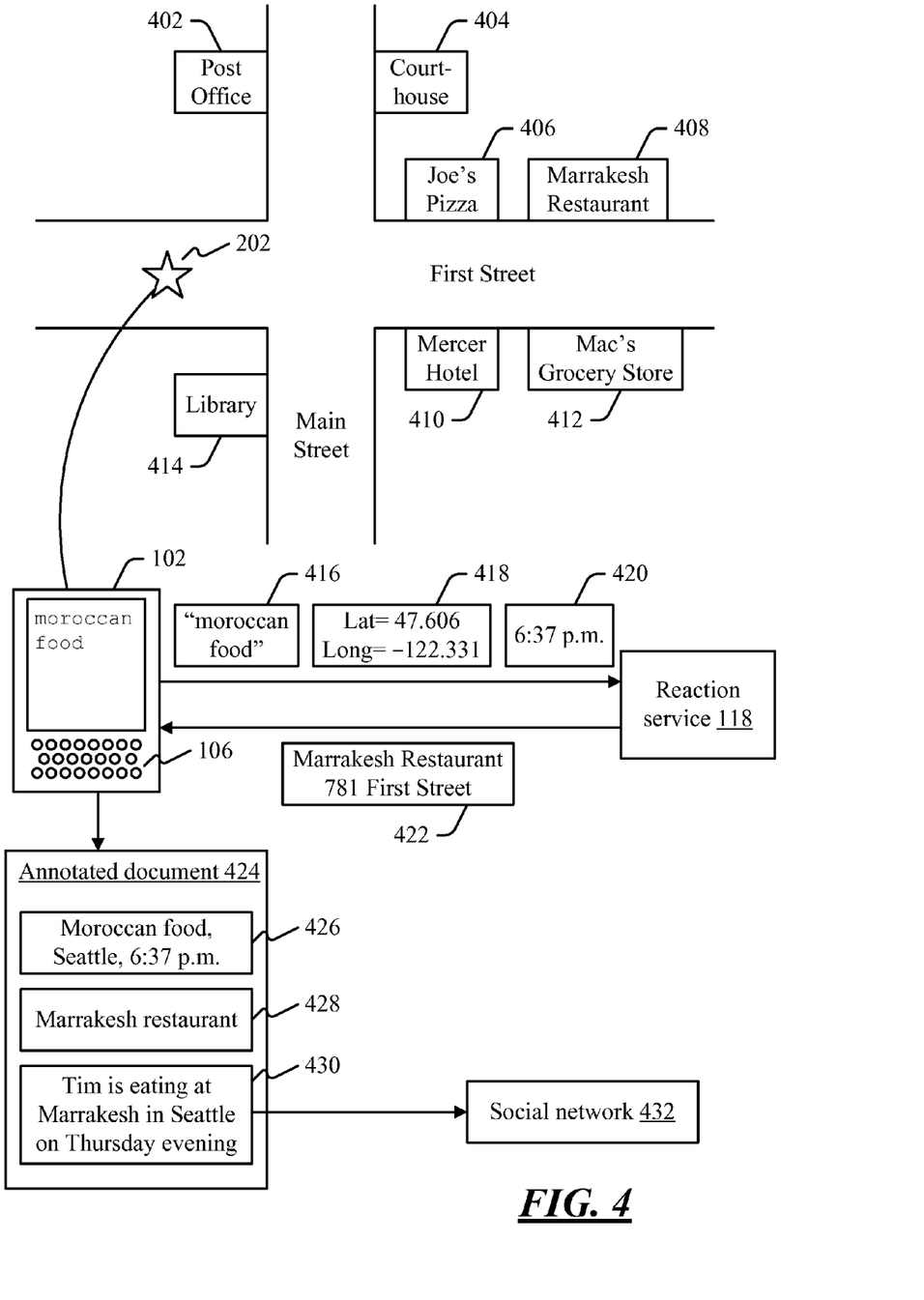
FIGS. 4-6 are block diagrams of example scenarios in which social media may be created on a device.
Figure 5:
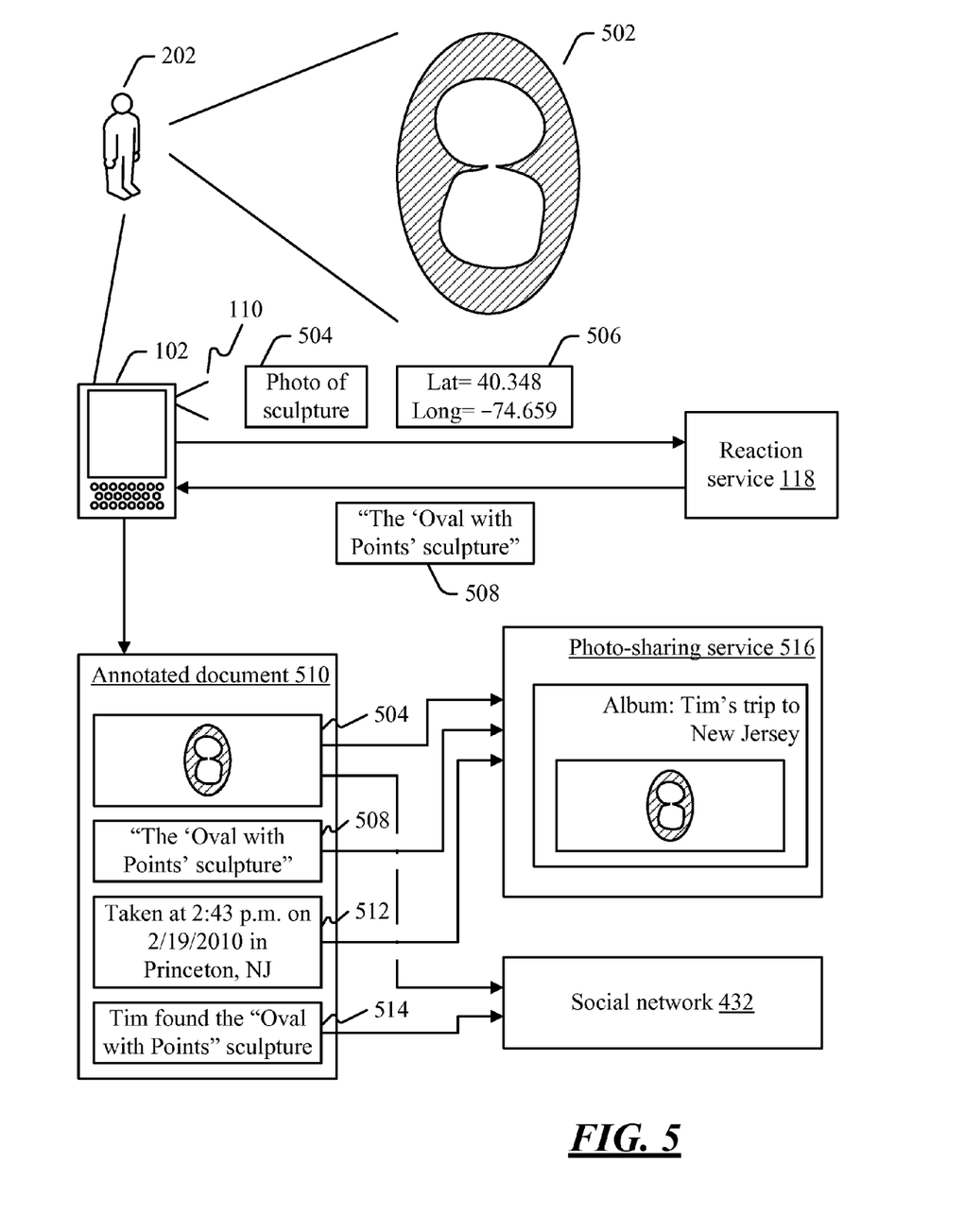
Figure 6:
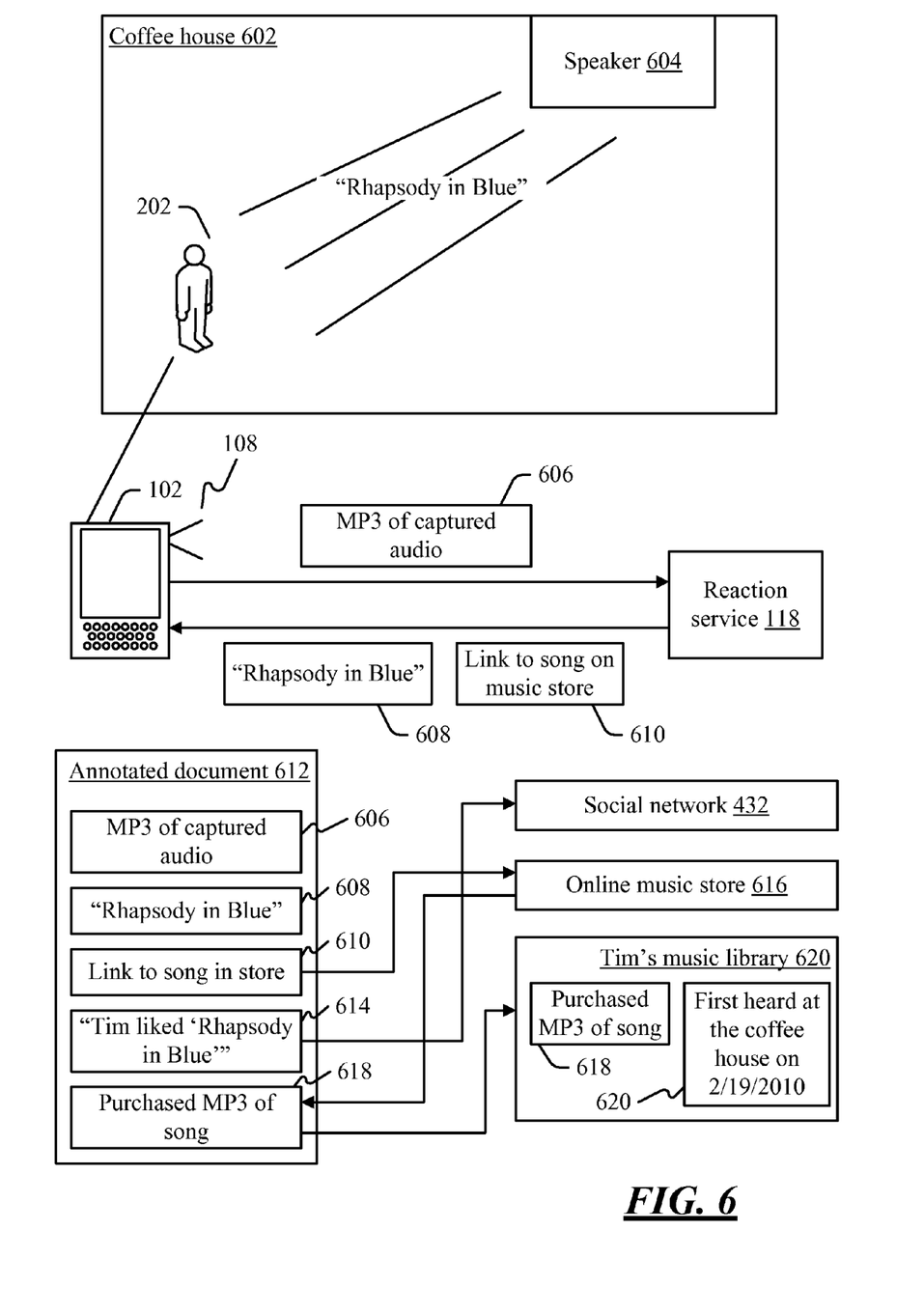

FIGS. 4-6 show some example scenarios in which social media may be created on a device.

FIG. 4 shows an example scenario in which a user performs a search to find a restaurant. User 202 is in a city at the location indicated by the star. User 202 is near the intersection of First and Main Streets. Businesses and other establishments in user 202's vicinity include post office 402, courthouse 404, pizza restaurant 406, Moroccan restaurant 408, hotel 410, grocery store 412, and library 414. User 202 carries device 102, which may be a smart phone, handheld computer, music player, etc. User 202 wants to find a nearby Moroccan restaurant, so user 202 uses keyboard 106 to enter the query "moroccan food" into his device. For example, user 202 may use the client application 132 (shown in FIG. 1) to enter a query to be transmitted to reaction service 118. Or user 202 may use a browser to visit the web site of reaction service 118, in which case user 202 enters the query into that web site.

After user 202 enters the query, various information may be transmitted to reaction service 118. This information may include the query itself (block 416), the latitude and longitude at which the user was located when the query was made (block 418), and the time at which the query was made (block 420). Device 102 may be equipped with some ability to identify its own location (e.g., components that triangulate device 102's location based on its position relative to cellular towers, or a Global Positioning System (GPS) that determines device 102's location based on signals from satellites). These components may provide the information contained in block 418. Moreover, device 102 may have a clock, and the time information in block 420 may be derived from this clock.

Reaction service 118 receives the various pieces of information in blocks 416-420, and reacts to that information. For example, based on the query in block 416, reaction service 118 knows that user 202 is looking for Moroccan food. Based on the location information in block 418, reaction service 118 knows that user 202 is in Seattle. And, based on the time information in block 420, reaction service 118 knows that user 202 is probably looking for dinner. Based on these pieces of information, reaction service returns some information to device 102. This information is shown in block 422, which contains the name and address of Marrakesh Restaurant—i.e., the Moroccan restaurant 408 that is near user 202. The information shown in block 422 constitutes a type of annotation to the information that service 118 received from device 102.

Based on the annotation provided, an annotated document 424 may be created. Annotated document contains the original information 426 that was transmitted to reaction service 118 ("Moroccan food, Seattle, 6:37 p.m."), and also contains reaction service 118's response 428 ("Marrakesh restaurant"). Additionally, the annotated document may contain a draft 430 of a social-networking-style post ("Tim is eating at Marrakesh in Seattle on Thursday evening."). This post can be posted to a social network 432. For example, client application 132 (shown in FIG. 1) may display draft 430, and may ask user 202 if he would like to post the text in that draft to a social network. If so, that application may make the post on behalf of user 202.

FIG. 5 shows an example in which the document created by user 202 is an image. In this example, user 202 is carrying device 102, which includes camera 110. User 202 sees sculpture 502, and takes a photo of it. In this example, sculpture 502 is the "Oval with Points" sculpture located on the Princeton University campus. Once the photo has been taken, device 102 transmits the photo to reaction service 118. The transmission of this photo to reaction service 118 may be facilitated by client application 132 (shown in FIG. 1). For example, after the photo has been taken, the photo may appear on the screen of device 102, and a button may appear over the photo that invites user 202 to transmit the photo to reaction service 118. If the user clicks the button, then the photo 504 may be transmitted to reaction service 118. Other information may also be transmitted. For example, the location 506 at which the photo was taken may also be transmitted.

Reaction service 118 reacts to the information it received by trying to identify the object in the photo. For example, reaction service 118 may have an indexed database of photos, and may attempt to compare what is shown in the photo with photos in its database. Additionally, reaction service 118 may have some model of what objects are located at particular geographic locations, and thus reaction service 118 may use location 506 to attempt to identify the object in the photo. Based on the information provided to reaction service 118, reaction service 118 may determine that the object in the photo is the "Oval with Points" sculpture. Thus, reaction service 118 provides an annotation 508 containing this information.

Once the annotation has been provided, an annotated document 510 may be created. This annotated document may include the original document (i.e., photo 504 of sculpture 502) and annotation 508. The annotated document may also contain other information pertaining to the photo, such as the date, time, and place at which the photo was taken (block 512). Additionally, the annotated document may contain a draft of a social network post (block 514) ("Tim found the 'Oval with Points' sculpture."). The information contained in annotated document 510 may be used in various ways. For example, user 202 may subscribe to a photo-sharing service 516, and the photo and some of its annotations may be posted to an album in that service. Thus, user 202 may have an album called "Tim's trip to New Jersey". The photo, along with labels identifying what is in the photo, and where and when the photo was taken (which are all examples of metadata), may be posted to that album. As another example, the draft network post (block 514) may be posted to social network 432. The posting of information to an album and/or a social network may be performed by an application on device 102 (e.g., client application 132, shown in FIG. 1).

FIG. 6 shows an example in which the document created by user 202 is an audio capture. In this example, user 202 is in coffee house 602. User 202 carries device 102, which is equipped with microphone 108. Coffee house 602 has a speaker 604, which is playing a particular song. User 202 wants to know what the song is, so user 202 uses microphone 108 on device 102 to capture the sound coming from the speaker. A document 606 containing this captured audio is created, and is transmitted to reaction service 118.

Reaction service 118 reacts to document 606 by comparing the audio in that document with its own database. Based on this comparison, reaction service determines that the song contained in the audio document is "Rhapsody in Blue." Thus, reaction service returns annotations to that document. One annotation is the name 608 of the song. Another annotation is a link 610 to the song at an online music store, which may be used to purchase the song.

After the annotations are returned, an annotated document 612 may be created. Annotated document 612 may contain the document 606 that contains the captured audio, the name 608 of the song contained in the audio document, and the link 610 to a purchasable version of the song. Additionally, annotated document 612 may contain a draft 614 of a social-network-style post concerning the fact that user 202 heard the song "Rhapsody in Blue."

User 202 may then take various actions with respect to the items in annotated document 612. For example, user 202 may follow link 610 in order to purchase a commercially-available version of "Rhapsody in Blue" from online music store 616. If user 202 does purchase the song, then the purchased version of the song 618 may become another annotation to the audio clip that user 202 captured. Additionally, that song may be placed in user 202's music library 620. Since the time at which user 202 captured the audio clip may be known (e.g., device 102 may be equipped with a clock, and may have recorded the time at which user 202 captured the audio clip), this fact can be stored in music library 620 as a type of annotation to the song. For example, the text "First heard at the coffee house on Feb. 19, 2010" (block 622) could be stored along with the purchased version of the song 618. As another example, the draft 614 of a social network post could be posted to social network 432.

Figure 7:
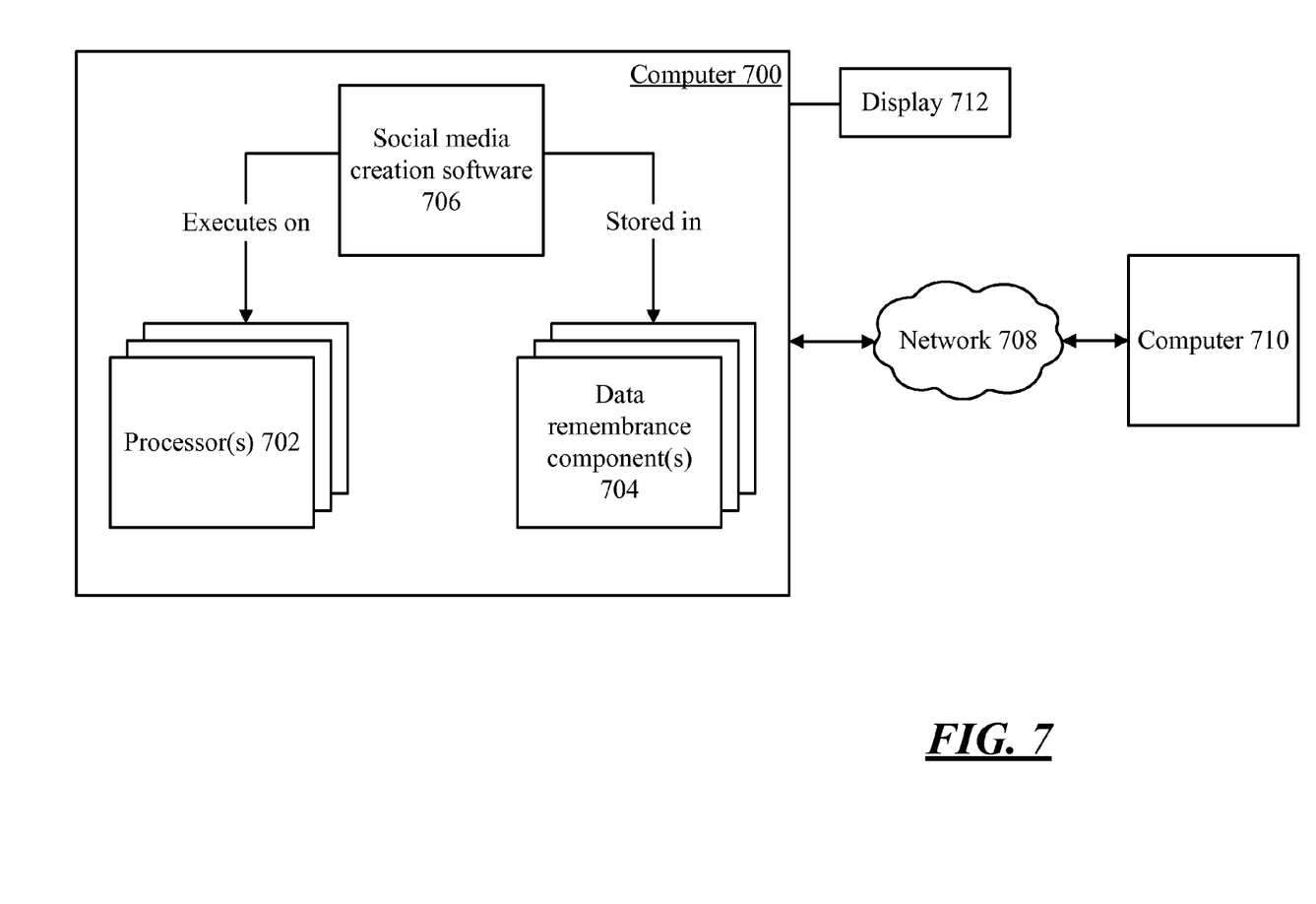
FIG. 7 is a block diagram of example components that may be used in connection with implementations of the subject matter described herein.

FIG. 7 shows an example environment in which aspects of the subject matter described herein may be deployed.

Computer 700 includes one or more processors 702 and one or more data remembrance components 704.

Processor(s) 702 are typically microprocessors, such as those found in a personal desktop or laptop computer, a server, a handheld computer, or another kind of computing device. Data remembrance component(s) 704 are components that are capable of storing data for either the short or long term. Examples of data remembrance component(s) 704 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 700 may comprise, or be associated with, display 712, which may be a cathode ray tube (CRT) monitor, a liquid crystal display (LCD) monitor, or any other type of monitor.

Software may be stored in the data remembrance component(s) 704, and may execute on the one or more processor(s) 702. An example of such software is social media creation software 706, which may implement some or all of the functionality described above in connection with FIGS. 1-6, although any type of software could be used. Software 706 may be implemented, for example, through one or more components, which may be components in a distributed system, separate files, separate functions, separate objects, separate lines of code, etc. A computer (e.g., personal computer, server computer, handheld computer, etc.) in which a program is stored on hard disk, loaded into RAM, and executed on the computer's processor(s) typifies the scenario depicted in FIG. 6, although the subject matter described herein is not limited to this example.

The subject matter described herein can be implemented as software that is stored in one or more of the data remembrance component(s) 704 and that executes on one or more of the processor(s) 702. As another example, the subject matter can be implemented as instructions that are stored on one or more computer-readable storage media. Tangible media, such as an optical disks or magnetic disks, are examples of storage media. The instructions may exist on non-transitory media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium.

Additionally, any acts described herein (whether or not shown in a diagram) may be performed by a processor (e.g., one or more of processors 702) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 700 may be communicatively connected to one or more other devices through network 708. Computer 710, which may be similar in structure to computer 700, is an example of a device that can be connected to computer 700, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of facilitating communication of information, the method comprising:
    using at least one processor to perform acts comprising:
        receiving first information through an input mechanism of a device;
        sending, to a service that is remote from said device, second information that comprises said first information;
        receiving, from said service, one or more items of third information, said service creating said items of third information in reaction to said second information, said service creating said items of third information by comparing said items of second information with data in a database;
        creating an annotated document that comprises said first information and said items of third information; and
        propagating, to one or more people, fourth information that comprises said annotated document and an identity of a user of said device, said one or more people being other than said user,
    said first information comprising a text query, said items of third information comprising results returned by a search engine in response to said query, said fourth information comprising said text query, said results, and said identity of said user, said fourth information being propagated to said one or more people by being posted on a social network.

2. The method of claim 1, wherein said acts further comprise:
    receiving, from said user, an indication of which ones of said one or more items of third information are to be attached to said first information as metadata.

3. The method of claim 1, wherein said first information comprises text that is received through a user input mechanism of said device, wherein said service performs a search based on said second information, wherein said third information comprises results of said search, and wherein said acts further comprise:
    creating a draft social network posting based on said third information, wherein said fourth information comprises said draft social network posting; and
    receiving, from said user, an indication that said draft social network posting is to be posted to said social network, wherein said propagating said fourth information to one or more people comprises posting said draft social network posting on said social network.

4. The method of claim 1, wherein said first information comprises an image captured by a camera of said device, wherein said third information comprises an identification of a person or object that appears in said image, and wherein said fourth information comprises said image and said identification.

5. The method of claim 1, wherein said first information comprises a sound recording captured by a microphone of said device, wherein said third information comprises an identification of a sound contained in said sound recording, and wherein said fourth information comprises said identification.

6. The method of claim 1, wherein said device comprises a communication device that communicates with said service through a cellular network.

7. A device for collecting and propagating information, wherein the device comprises:
    a content input mechanism through which said device receives content;
    a memory;

a processor; and a client application that is stored in said memory and that executes on said processor, said client application, upon instruction from a first user of the device, sending, to a service that is located remotely from said device and with which the device communicates through a network, content received through said content input mechanism, and said client application receiving from the service one or more annotations of said content, combining said content and a first one of said one or more annotations to create an annotated document, and propagating said annotated document to one or more second users, said service creating said one or more annotations by comparing said content with data in a database, said one or more second users being other than said first user, said content comprising a text query, said one or more annotations comprising results that a search engine generates in response to said query, said annotated document comprising said text query, said results, an identity of said first user, said annotated document being propagated to one or more second users by posting said annotated document on a social network.

8. The device of claim 7, wherein said client application receives, from said first user, an indication of which of said one or more annotations are to be attached to said content as metadata.

9. The device of claim 7, wherein said content input mechanism comprises a text input mechanism, wherein said content comprises a text query, and wherein said one or more annotations comprise search results generated in response to said query.

10. The device of claim 9, wherein said client application propagates said annotated document by posting, to said social network, a post that said client application creates based on said content and on said results.

11. The device of claim 7, wherein said content input mechanism comprises a camera, wherein said content comprises an image, wherein said one or more annotations comprise an identification of a person or object that appears in said image, and wherein said client application propagates said annotated document by posting said image and said identification to an online photo album associated with said first user.

12. The device of claim 7, wherein said content input mechanism comprises a microphone, wherein said content comprises a sound recording, wherein said one or more annotations comprise an identification of a song in said sound recording, and wherein said client application propagates said annotated document by communicating, to said one or more second users, information concerning said song.

13. The device of claim 7, wherein said client application communicates, to said service, a time at which said content was received and a geographic location at which said device was located at said time, wherein said one or more annotations are based on said content, said time, and said geographic location.

14. A computer-readable storage device that stores executable instructions for facilitating communication of information, the executable instructions, when executed by a computer, causes the computer to perform acts comprising:

receiving first information through an input mechanism of a device;

sending, to a service that is remote from said device, second information that comprises said first information;

receiving, from said service, one or more items of third information, said service creating said items of third information in reaction to said second information, said service creating said items of third information by comparing said items of second information with data in a database;

creating an annotated document that comprises said first information and said items of third information; and propagating, to one or more people, fourth information that comprises said annotated document and an identity of a user of said device, said one or more people being other than said user, said first information comprising a text query, said items of third information comprising results returned by a search engine in response to said query, said fourth information comprising said text query, said results, and said identity of said user, said fourth information being propagated to said one or more people by being posted on a social network.

15. The computer-readable storage device of claim 14, wherein said acts further comprise:

receiving, from said user, an indication of which ones of said one or more items of third information are to be attached to said first information as metadata.

16. The computer-readable storage device of claim 14, wherein said first information comprises text that is received through a user input mechanism of said device, wherein said service performs a search based on said second information, wherein said third information comprises results of said search, and wherein said acts further comprise:

creating a draft social network posting based on said third information, wherein said fourth information comprises said draft social network posting; and receiving, from said user, an indication that said draft social network posting is to be posted to said social network, wherein said propagating said fourth information to one or more people comprises posting said draft social network posting on said social network.

17. The computer-readable storage device of claim 14, wherein said first information comprises an image captured by a camera of said device, wherein said third information comprises an identification of a person or object that appears in said image, and wherein said fourth information comprises said image and said identification.

* * * * *